US012659035B2

(12) United States Patent
Yang et al.

(10) Patent No.: US 12,659,035 B2
(45) Date of Patent: Jun. 16, 2026

(54) OPTICAL COMMUNICATION SYSTEM AND METHOD, OPTICAL MODULE, AND APPARATUS USED IN OPTICAL MODULE

(71) Applicant: HUAWEI TECHNOLOGIES CO., LTD., Shenzhen (CN)

(72) Inventors: Rui Yang, Shanghai (CN); Yanyan Chen, Shanghai (CN); Ziqiang Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 18/464,196

(22) Filed: Sep. 8, 2023

(65) Prior Publication Data

US 2023/0421261 A1    Dec. 28, 2023

Related U.S. Application Data

(63) Continuation of application No. PCT/CN2021/079770, filed on Mar. 9, 2021.

(51) Int. Cl.
*H04B 10/2575*    (2013.01)
*H04B 10/27*    (2013.01)
*H04W 88/08*    (2009.01)

(52) U.S. Cl.
CPC ....... *H04B 10/25758* (2013.01); *H04B 10/27* (2013.01); *H04B 2210/006* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 2004/0096222 A1* | 5/2004 | Cagenius | ......... | H04B 10/25755 |
| | | | | 398/115 |
| 2008/0199183 A1* | 8/2008 | Liu | ........................ | H04J 3/1617 |
| | | | | 398/103 |
| 2011/0188858 A1 | 8/2011 | Kim et al. | | |
| 2011/0223958 A1* | 9/2011 | Chen | ................. | H04W 72/0473 |
| | | | | 455/522 |
| 2012/0039254 A1* | 2/2012 | Stapleton | .............. | H03F 1/3247 |
| | | | | 370/328 |
| 2013/0089336 A1 | 4/2013 | Dahlfort et al. | | |
| 2013/0337750 A1* | 12/2013 | Ko | ........................ | H04W 24/00 |
| | | | | 455/67.13 |

(Continued)

FOREIGN PATENT DOCUMENTS

| | | |
|---|---|---|
| CN | 101350662 A | 1/2009 |
| CN | 106059660 A | 10/2016 |

(Continued)

*Primary Examiner* — Darren E Wolf

(57) ABSTRACT

An optical communication system includes N optical modules at the local end. Each optical module includes a first optical interface and a second optical interface. A first optical interface of a first optical module in each of the N optical modules at the local end is connected to a peer end through a common optical fiber. A second optical interface of an $i^{th}$ optical module in the N optical modules at the local end is connected to a first optical interface of an $(i+1)^{th}$ optical module in the N optical modules at the local end, and $i=1, 2, \ldots, N-1$.

12 Claims, 6 Drawing Sheets

(56)                    References Cited

U.S. PATENT DOCUMENTS

2014/0242999 A1*  8/2014  Goshen ............... H04L 43/0823
                                                                455/445
2014/0355991 A1*  12/2014  Cameirao ............. H04J 3/1617
                                                                398/79
2020/0186250 A1*   6/2020  Stapleton ................ H04L 25/02

FOREIGN PATENT DOCUMENTS

CN        107342821  A    11/2017
EP          2819324  A2   12/2014
WO        2016165089  A1   10/2016

* cited by examiner

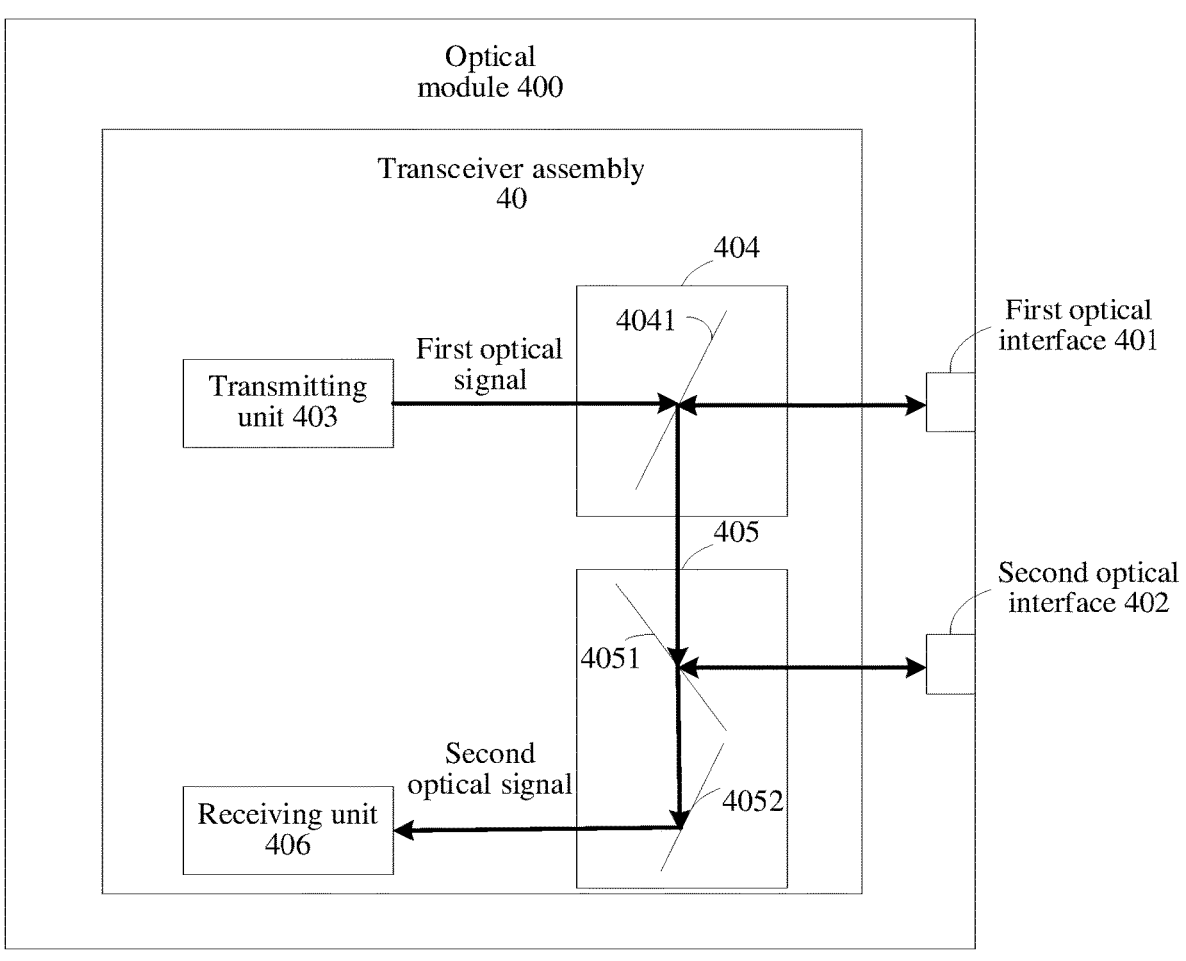

Connect a first optical interface of a first optical module in N optical modules at a local end to a peer end through an optical fiber link, and connect a second optical interface of an $i^{th}$ optical module in the N optical modules at the local end to a first optical interface of an $(i+1)^{th}$ optical module in the N optical modules at the local end, where each optical module includes a first optical interface and a second optical interface, and i=1, 2, ..., N–1                    ⌐ S501

Connect a first optical interface of a first optical module in N optical modules at the peer end to the first optical interface of the first optical module in the N optical modules at the local end through the optical fiber link, and connect a second optical interface of an $i^{th}$ optical module in the N optical modules at the peer end to a first optical interface of an $(i+1)^{th}$ optical module in the N optical modules at the peer end                    ⌐ S502

FIG. 8

OPTICAL COMMUNICATION SYSTEM AND METHOD, OPTICAL MODULE, AND APPARATUS USED IN OPTICAL MODULE

CROSS-REFERENCE TO RELATED APPLICATIONS

This application is a continuation of International Application No. PCT/CN2021/079770 filed on Mar. 9, 2021, the disclosure of which is hereby incorporated by reference in its entirety.

TECHNICAL FIELD

This disclosure relates to the field of optical communications, and more specifically, to an optical communication system and method, an optical module, and an apparatus used in an optical module.

BACKGROUND

A deployment manner of a radio access network (RAN) includes a centralized radio access network (CRAN) and a distributed radio access network (DRAN). The CRAN resolves problems of site acquisition difficulty, high construction as well as operation and maintenance costs, and increasing energy consumption in network construction. In a CRAN scenario, a distributed unit (DU) or a baseband unit (BBU) is deployed in a central equipment room in a centralized manner, and an active antenna unit (AAU) or a remote radio unit RRU is distributed at a remote end. One DU or BBU may be connected to a plurality of AAUs or RRUs through optical fibers.

As demand for services continuously increases, a quantity of the AAUs or RRUs also increases. As a result, a large quantity of optical fiber resources are to be consumed to connect the AAUs or RRUs to the DU or BBU. In the CRAN scenario, how to save optical fiber resources is an urgent problem to be resolved.

SUMMARY

This application provides an optical communication system and method, an optical module, and an apparatus used in an optical module, which can save optical fiber resources. According to a first aspect, an optical communication system is provided, including N optical modules at a local end. Each optical module in the N optical modules at the local end includes a first optical interface and a second optical interface. A first optical interface of a first optical module in the N optical modules at the local end is connected to a peer end through an optical fiber link. A second optical interface of an $i^{th}$ optical module in the N optical modules at the local end is connected to a first optical interface of an $(i+1)^{th}$ optical module in the N optical modules at the local end, and $i=1, 2, \ldots, N-1$.

In the optical communication system provided in this application, an optical module at the local end may be connected to a fronthaul interface at the local end. The plurality of optical modules at the local end are cascaded, so that communication between a plurality of fronthaul interfaces at the local end and the peer end can be implemented through only one optical fiber link (including one or more optical fibers), thereby saving optical fiber resources. In addition, it is unnecessary to introduce another element, such as a passive multiplexer/demultiplexer, in the optical communication system provided in this application. Therefore, network construction costs can be reduced.

With reference to the first aspect, in some implementations of the first aspect, each optical module in the N optical modules at the local end is connected to a fronthaul interface at the local end. Each optical module in the N optical modules at the local end is connected to a fronthaul interface at the local end. And each of the N optical modules at the local end is connected to one fronthaul interface at the local end. The first optical module in the N optical modules at the local end is configured to:

convert, into an optical signal of a first wavelength, an electrical signal input from a fronthaul interface connected to the first optical module, output the optical signal to the peer end through the first optical interface of the first optical module, and output, to the peer end through the first optical interface of the first optical module, an optical signal input from a first optical interface of a second optical module to a second optical interface of the first optical module; and convert, into an electrical signal, an optical signal of an $(N+1)^{th}$ wavelength input from the peer end to the first optical interface of the first optical module, output the electrical signal to the fronthaul interface connected to the first optical module, and output, to the first optical interface of the second optical module through the second optical interface of the first optical module, an optical signal of another wavelength input from the peer end to the first optical interface of the first optical module.

A $j^{th}$ optical module in the N optical modules at the local end is configured to:

convert, into an optical signal of a $j^{th}$ wavelength, an electrical signal input from a fronthaul interface connected to the $j^{th}$ optical module, output the optical signal to a second optical interface of a $(j-1)^{th}$ optical module through a first optical interface of the $j^{th}$ optical module, and output, to the second optical interface of the $(j-1)^{th}$ optical module through the first optical interface of the $j^{th}$ optical module, an optical signal input from a first optical interface of a $(j+1)^{th}$ optical module to a second optical interface of the $j^{th}$ optical module; and convert, into an electrical signal, an optical signal of a $(j+N)^{th}$ wavelength input from a first optical interface of the $(j-1)^{th}$ optical module to the first optical interface of the $j^{th}$ optical module, output the electrical signal to the fronthaul interface connected to the $j^{th}$ optical module, and output, to the first optical interface of the $(j+1)^{th}$ optical module through the second optical interface of the $j^{th}$ optical module, an optical signal of another wavelength input from the first optical interface of the $(j-1)^{th}$ optical module to the first optical interface of the $j^{th}$ optical module, where $j=2, 3, \ldots, N-1$.

An $N^{th}$ optical module in the N optical modules at the local end is configured to:

convert, into an optical signal of an $N^{th}$ wavelength, an electrical signal input from a fronthaul interface connected to the $N^{th}$ optical module, and output the optical signal to a second optical interface of an $(N-1)^{th}$ optical module through a first optical interface of the $N^{th}$ optical module; and convert, into an electrical signal, an optical signal of a $2N^{th}$ wavelength input to the first optical interface of the $N^{th}$ optical module, and output the electrical signal to the fronthaul interface connected to the $N^{th}$ optical module.

Optionally, the first wavelength, a second wavelength, . . . , and the $2N^{th}$ wavelength are different from each other. A wavelength may be a specific value, or may be a value range. When the wavelength is a numerical range, numerical ranges of the first wavelength, the second wavelength, and the $2N^{th}$ wavelength do not overlap with each other. For example, N is 2. The first wavelength ranges from 1271 nm to 1371 nm. The second wavelength ranges from 1379.23 nm to 1432.41 nm. A third wavelength ranges from 1529.55 nm to 1567.13 nm. A fourth wavelength ranges from 1865.25 nm to 1970.13 nm.

Based on this solution, an optical-layer wavelength division solution and wavelength add/drop multiplexing can be implemented. In this way, transparent transmission of a protocol and a rate can be implemented.

Optionally, the fronthaul interface may be a common public radio interface (CPRI) or an enhanced common public radio interface (eCPRI).

With reference to the first aspect, in some implementations of the first aspect, the system further includes N optical modules at the peer end. Each optical module in the N peer optical modules at the peer end includes a first optical interface and a second optical interface. A first optical interface of a first optical module in the N optical modules at the peer end is connected to the first optical interface of the first optical module in the N optical modules at the local end through the optical fiber link. A second optical interface of an $i^{th}$ optical module in the N optical modules at the peer end is connected to a first optical interface of an $(i+1)^{th}$ optical module in the N optical modules at the peer end.

Based on this solution, an optical module at the peer end may be connected to a fronthaul interface at the peer end. The plurality of optical modules at the peer end are cascaded, so that communication between a plurality of fronthaul interfaces at the local end and a plurality of fronthaul interfaces at the peer end can be implemented through only one optical fiber link, thereby saving optical fiber resources. In addition, in this solution, it is unnecessary to introduce another device, such as a passive multiplexer/demultiplexer. Therefore, network construction costs can be reduced.

With reference to the first aspect, in some implementations of the first aspect, the local end includes one or more baseband modules of a base station, and the peer end includes one or more radio frequency modules of the base station. Alternatively, the local end includes one or more radio frequency modules of a base station, and the peer end includes one or more baseband modules of the base station.

With reference to the first aspect, in some implementations of the first aspect, each optical module in the N optical modules at the local end is connected to a fronthaul interface of a baseband module at the local end.

Alternatively, each optical module in the N optical modules at the local end is connected to a fronthaul interface of a radio frequency module at the local end.

With reference to the first aspect, in some implementations of the first aspect, a $k^{th}$ optical module in the N optical modules at the local end includes a transmitting unit, a first optical unit, a second optical unit, and a receiving unit. The transmitting unit, the first optical interface, and the second optical unit are all coupled to the first optical unit, the receiving unit and the second optical interface are both coupled to the second optical unit, and k=1, 2, . . . , N. The transmitting unit is configured to convert, into an optical signal of a $k^{th}$ wavelength, an electrical signal input from a fronthaul interface connected to the $k^{th}$ optical module, and transmit a first optical signal to the first optical interface.

In a case that k≠T, the first optical unit is configured to forward, to the first optical interface, the optical signal of the $k^{th}$ wavelength received from the transmitting unit, forward, to the first optical interface, an optical signal of a $(k+1)^{th}$ wavelength to the $N^{th}$ wavelength received from the second optical unit, and forward, to the second optical unit, an optical signal of a $(k+N)^{th}$ wavelength to the $2N^{th}$ wavelength received from the first optical interface;

the second optical unit is configured to forward, to the first optical unit, the optical signal of the $(k+1)^{th}$ wavelength to the $N^{th}$ wavelength received from the second optical interface, forward, to the receiving unit, an optical signal of the $(k+N)^{th}$ wavelength received from the first optical unit, and forward, to the second optical interface, an optical signal of a $(k+N+1)^{th}$ wavelength to the $2N^{th}$ wavelength received from the first optical unit; and the receiving unit is configured to receive the optical signal of the $(k+N)^{th}$ wavelength from the second optical unit, convert the optical signal into an electrical signal, and output the electrical signal to the fronthaul interface connected to the $k^{th}$ optical module.

In a case that k=N, the first optical unit is configured to forward, to the first optical interface, the optical signal of the $k^{th}$ wavelength received from the transmitting unit, and forward, to the second optical unit, an optical signal of the $2N^{th}$ wavelength received from the first optical interface;

the second optical unit is configured to forward, to the receiving unit, the optical signal of the $2N^{th}$ wavelength received from the first optical unit; and the receiving unit is configured to receive the optical signal of the $2N^{th}$ wavelength from the second optical unit, convert the optical signal into an electrical signal, and output the electrical signal to the fronthaul interface connected to the $k^{th}$ optical module.

Based on this solution, the optical module transmits the optical signal of the $k^{th}$ wavelength, receives the optical signal of the $(k+N)^{th}$ wavelength, forwards another signal that passes through the first optical interface to the second optical interface, and forwards another signal that passes through the second optical interface to the first optical interface, so that an optical-layer wavelength division solution and wavelength add/drop multiplexing can be implemented. In this way, transparent transmission of a protocol and a rate can be implemented.

With reference to the first aspect, in some implementations of the first aspect, the first optical unit is configured to transmit the optical signal of the $k^{th}$ wavelength and reflect an optical signal of another wavelength. The second optical unit is configured to transmit the optical signal of the $(k+N)^{th}$ wavelength and reflect an optical signal of another wavelength.

With reference to the first aspect, in some implementations of the first aspect, a first optical path is parallel to a second optical path. The first optical path is an optical path for transmitting the optical signal of the $k^{th}$ wavelength between the transmitting unit and the first optical unit. The second optical path is an optical path for transmitting the optical signal of the $(k+N)^{th}$ wavelength between the second optical unit and the receiving unit.

Based on this solution, the first optical path and the second optical path are designed as parallel optical paths, so that a package area of the optical module can be reduced.

With reference to the first aspect, in some implementations of the first aspect, the first optical unit includes a first optical filter, and the second optical unit includes a second optical filter.

With reference to the first aspect, in some implementations of the first aspect, the first optical filter and the second optical filter are both 45° optical filters.

With reference to the first aspect, in some implementations of the first aspect, the second optical unit further includes a first reflector. The first reflector is configured to reflect, to the receiving unit, the optical signal of the $(k+N)^{th}$ wavelength transmitted through the second optical filter.

Based on this solution, the first optical path can be parallel to the second optical path, so that a package area of the optical module can be reduced.

With reference to the first aspect, in some implementations of the first aspect, the transmitting unit, the first optical unit, the second optical unit, and the receiving unit are encapsulated in a bi-directional optical subassembly (BOSA).

With reference to the first aspect, in some implementations of the first aspect, the transmitting unit is a laser.

According to a second aspect, an optical communication method is provided, including: connecting a first optical interface of a first optical module in N optical modules at a local end to a peer end through an optical fiber link; and connecting a second optical interface of an $i^{th}$ optical module in the N optical modules at the local end to a first optical interface of an $(i+1)^{th}$ optical module in the N optical modules at the local end. Each optical module in the N optical modules at the local end includes a first optical interface and a second optical interface, and i=1, 2, . . . , N−1.

According to the method provided in this application, an optical module at the local end may be connected to a fronthaul interface at the local end. The plurality of optical modules at the local end are cascaded, so that communication between a plurality of fronthaul interfaces at the local end and the peer end can be implemented through only one optical fiber link, thereby saving optical fiber resources. In addition, in the method provided in this application, it is unnecessary to introduce another element, such as a passive multiplexer/demultiplexer. Therefore, network construction costs can be reduced.

With reference to the second aspect, in some implementations of the second aspect, the connecting a first optical interface of a first optical module in N optical modules at a local end to a peer end through an optical fiber link includes: connecting the first optical interface of the first optical module in the N optical modules at the local end to a first optical interface of a first optical module in N optical modules at the peer end through the optical fiber link. The method further includes: connecting a second optical interface of an $i^{th}$ optical module in the N optical modules at the peer end to a first optical interface of an $(i+1)^{th}$ optical module in the N optical modules at the peer end. Each optical module in the N optical modules at the peer end includes a first optical interface and a second optical interface.

With reference to the second aspect, in some implementations of the second aspect, the local end includes one or more baseband modules of a base station, and the peer end includes one or more radio frequency modules of the base station. Alternatively, the local end includes one or more radio frequency modules of a base station, and the peer end includes one or more baseband modules of the base station.

With reference to the second aspect, in some implementations of the second aspect, when the local end includes the one or more baseband modules of the base station, the method further includes: connecting each optical module in the N optical modules at the local end to a fronthaul interface of a baseband module. Alternatively, when the local end includes the one or more radio frequency modules of the base station, the method further includes: connecting each optical module in the N optical modules at the local end to a fronthaul interface of a radio frequency module.

For beneficial effects of corresponding implementations of the second aspect, refer to descriptions of beneficial effects of corresponding implementations of the first aspect.

According to a third aspect, an optical module is provided, including a transmitting unit, a first optical unit, a second optical unit, a receiving unit, a first optical interface, and a second optical interface. The transmitting unit, the first optical interface, and the second optical unit are all coupled to the first optical unit. The receiving unit and the second optical interface are both coupled to the second optical unit. The transmitting unit is configured to convert, into a first optical signal, an electrical signal input to the transmitting unit, and transmit the first optical signal to the first optical interface. The first optical unit is configured to forward, to the first optical interface, the first optical signal received from the transmitting unit, forward, to the first optical interface, an optical signal received from the second optical unit, and forward, to the second optical unit, an optical signal received from the first optical interface. The second optical unit is configured to forward, to the first optical unit, the optical signal received from the second optical interface, forward, to the receiving unit, a second optical signal received from the first optical unit, and forward, to the second optical interface, an optical signal received from the first optical unit. The receiving unit is configured to receive the second optical signal from the second optical unit, convert the second optical signal into an electrical signal, and output the electrical signal.

The optical module provided in this application transmits the first optical signal, receives the second optical signal, forwards another signal that passes through the first optical interface to the second optical interface, and forwards another signal that passes through the second optical interface to the first optical interface, so that an optical-layer wavelength division solution and wavelength add/drop multiplexing can be implemented. In this way, transparent transmission of a protocol and a rate can be implemented.

With reference to the third aspect, in some implementations of the third aspect, the first optical unit is configured to transmit the first optical signal and reflect an optical signal of another wavelength. The second optical unit is configured to transmit the second optical signal and reflect an optical signal of another wavelength.

With reference to the third aspect, in some implementations of the third aspect, a first optical path is parallel to a second optical path. The first optical path is an optical path for transmitting the first optical signal between the transmitting unit and the first optical unit. The second optical path is an optical path for transmitting the second optical signal between the second optical unit and the receiving unit.

Based on this solution, the first optical path and the second optical path are designed as parallel optical paths, so that a package area of the optical module can be reduced.

With reference to the third aspect, in some implementations of the third aspect, the first optical unit includes a first optical filter, and the second optical unit includes a second optical filter.

With reference to the third aspect, in some implementations of the third aspect, the first optical filter and the second optical filter are both 45° optical filters.

With reference to the third aspect, in some implementations of the third aspect, the second optical unit further includes a first reflector. The first reflector is configured to reflect, to the receiving unit, the second optical signal transmitted through the second optical filter.

Based on this solution, the first optical path can be parallel to the second optical path, so that a package area of the optical module can be reduced.

With reference to the third aspect, in some implementations of the third aspect, the transmitting unit, the first optical unit, the second optical unit, and the receiving unit are encapsulated in a bi-directional optical subassembly (BOSA).

With reference to the third aspect, in some implementations of the third aspect, the transmitting unit is a laser.

According to a fourth aspect, an apparatus used in an optical module is provided. The optical module includes a first optical interface and a second optical interface. The apparatus includes a transmitting unit, a first optical unit, a second optical unit, and a receiving unit. The transmitting unit, the first optical interface, and the second optical unit are all coupled to the first optical unit. The receiving unit and the second optical interface are both coupled to the second optical unit. The transmitting unit is configured to convert, into a first optical signal, an electrical signal input to the transmitting unit, and transmit the first optical signal to the first optical interface. The first optical unit is configured to forward, to the first optical interface, the first optical signal received from the transmitting unit, forward, to the first optical interface, an optical signal received from the second optical unit, and forward, to the second optical unit, an optical signal received from the first optical interface. The second optical unit is configured to forward, to the first optical unit, the optical signal received from the second optical interface, forward, to the receiving unit, a second optical signal received from the first optical unit, and forward, to the second optical interface, an optical signal received from the first optical unit. The receiving unit is configured to receive the second optical signal from the second optical unit, convert the second optical signal into an electrical signal, and output the electrical signal.

A transceiver assembly provided in this application transmits the first optical signal, receives the second optical signal, forwards another signal that passes through the first optical interface to the second optical interface, and forwards another signal that passes through the second optical interface to the first optical interface, so that an optical-layer wavelength division solution and wavelength add/drop multiplexing can be implemented. In this way, transparent transmission of a protocol and a rate can be implemented.

With reference to the fourth aspect, in some implementations of the fourth aspect, the first optical unit is configured to transmit the first optical signal and reflect an optical signal of another wavelength. The second optical unit is configured to transmit the second optical signal and reflect an optical signal of another wavelength.

With reference to the fourth aspect, in some implementations of the fourth aspect, a first optical path is parallel to a second optical path. The first optical path is an optical path for transmitting the first optical signal between the transmitting unit and the first optical unit. The second optical path is an optical path for transmitting the second optical signal between the second optical unit and the receiving unit.

Based on this solution, the first optical path and the second optical path are designed as parallel optical paths, so that a package area of the optical module can be reduced.

With reference to the fourth aspect, in some implementations of the fourth aspect, the first optical unit includes a first optical filter, and the second optical unit includes a second optical filter.

With reference to the fourth aspect, in some implementations of the fourth aspect, the first optical filter and the second optical filter are both 45° optical filters.

With reference to the fourth aspect, in some implementations of the fourth aspect, the second optical unit further includes a first reflector. The first reflector is configured to reflect, to the receiving unit, the second optical signal transmitted through the second optical filter.

Based on this solution, the first optical path can be parallel to the second optical path, so that a package area of the optical module can be reduced.

With reference to the fourth aspect, in some implementations of the fourth aspect, the transmitting unit is a laser.

BRIEF DESCRIPTION OF DRAWINGS

FIG. 7 is a schematic diagram of a structure of an optical module according to this disclosure; and FIG. 8 is a schematic flowchart of an optical communication method according to this disclosure.

DESCRIPTION OF EMBODIMENTS

The following describes technical solution of this disclosure with reference to the accompanying drawings.

The technical solution in embodiments of this disclosure may be applied to various communication systems, for example, a 4th generation (4G) system, such as a long term evolution (LTE) system, a 5th generation (5G) system, such as a new radio (NR), or another communication system that may appear in the future.

In the foregoing communication systems, a base station may communicate with one or more terminals. The base station may include one or more baseband modules, one or more radio frequency modules, and one or more antennas. By using the one or more baseband modules, the one or more radio frequency modules, and the one or more antennas, the base station can implement communication with the one or more terminals.

The baseband module may perform baseband processing, for example, processing a digital signal or a baseband signal. The radio frequency module may perform radio frequency processing, for example, performing mutual conversion between a digital signal or a baseband signal and a radio frequency signal. The antenna may transmit or receive a radio frequency signal. For example, after processing a digital signal or a baseband signal, the baseband module sends the processed digital signal or the processed baseband signal to the radio frequency module, the radio frequency module may convert the digital signal or the baseband signal into a radio frequency signal, and the antenna transmits the radio frequency signal. Alternatively, the antenna sends a received radio frequency signal to the radio frequency module, the radio frequency module may convert the radio frequency signal into a digital signal or a baseband signal, and the baseband module processes the digital signal or the baseband signal.

Transmission between the baseband module and the radio frequency module may be referred to as fronthaul. One baseband module may include one or more fronthaul interfaces, and one radio frequency module may include one or more fronthaul interfaces. One or more fronthaul interfaces of one baseband module may be connected to one or more fronthaul interfaces of one radio frequency module. The foregoing names such as the fronthaul and the fronthaul interface are merely examples. It may be understood that the transmission between the baseband module and the radio frequency module may have another name, and an interface on the baseband module or the radio frequency module may have another name. This is not limited in embodiments of this application.

The following is described by using a 4G base station and a 5G base station as examples.

Figure 1:
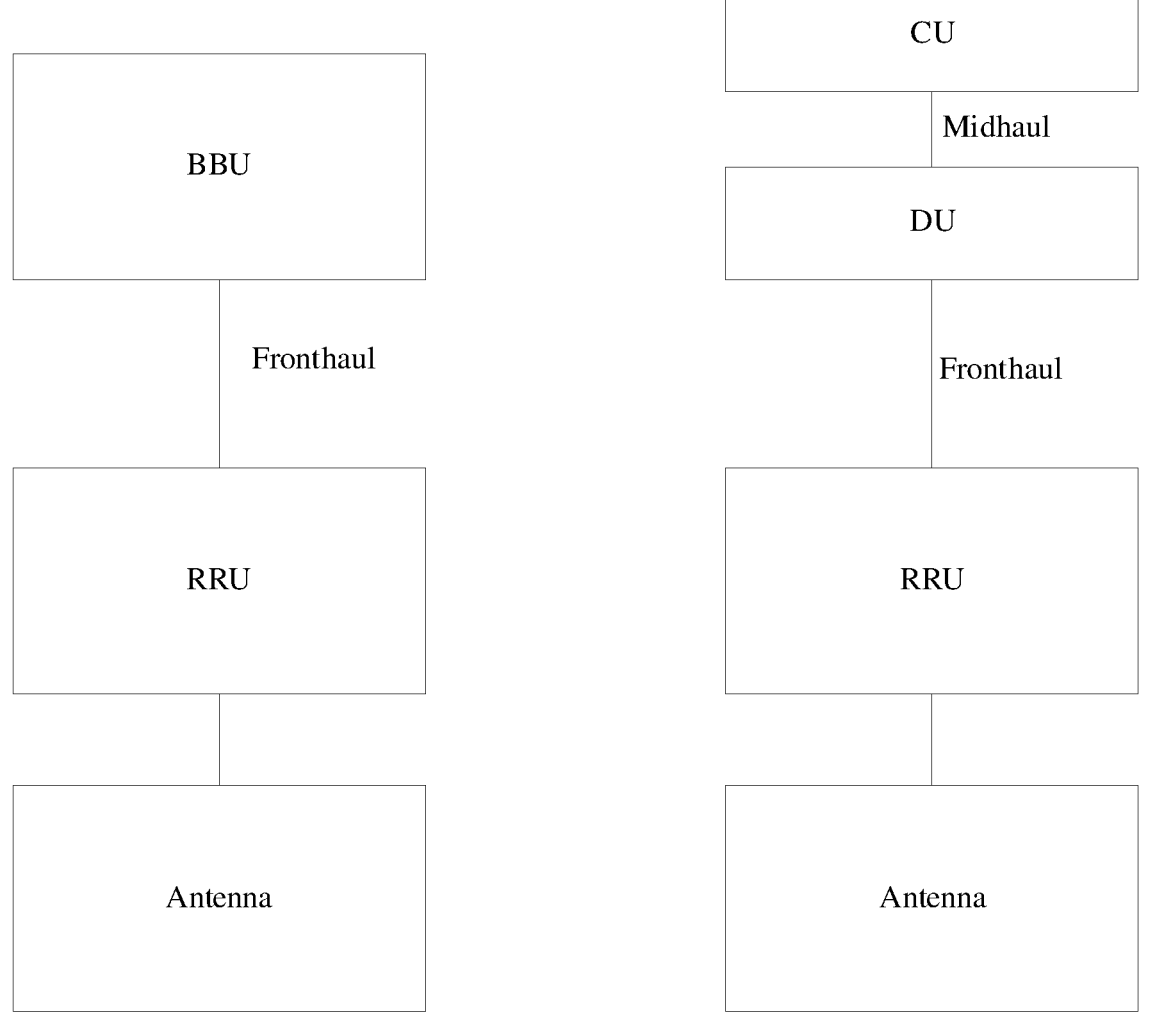
FIG. 1 is a schematic diagram of a structure of a RAN in 4G and 5G.

FIG. 1 shows a schematic diagram of a structure of a RAN base station in 4G and 5G. Refer to FIG. 1. A 4G RAN base station may include a baseband unit (BBU), a remote radio unit (RRU), and an antenna. The BBU corresponds to a baseband module, and the RRU corresponds to a radio frequency module. Transmission between the BBU and the RRU is referred to as fronthaul. A 5G RAN base station may include a central unit (CU), a distributed unit (DU), an RRU, and an antenna. The DU corresponds to a baseband module, and the RRU corresponds to a radio frequency module. Transmission between the DU and the RRU is referred to as fronthaul, and transmission between the CU and the DU is referred to as midhaul. In an implementation, the RRU and the antenna may be implemented by using an active antenna unit (AAU). In this case, the AAU corresponds to the radio frequency module. Transmission between the BBU and the AAU or transmission between the DU and the RRU may be referred to as fronthaul.

Figure 2:
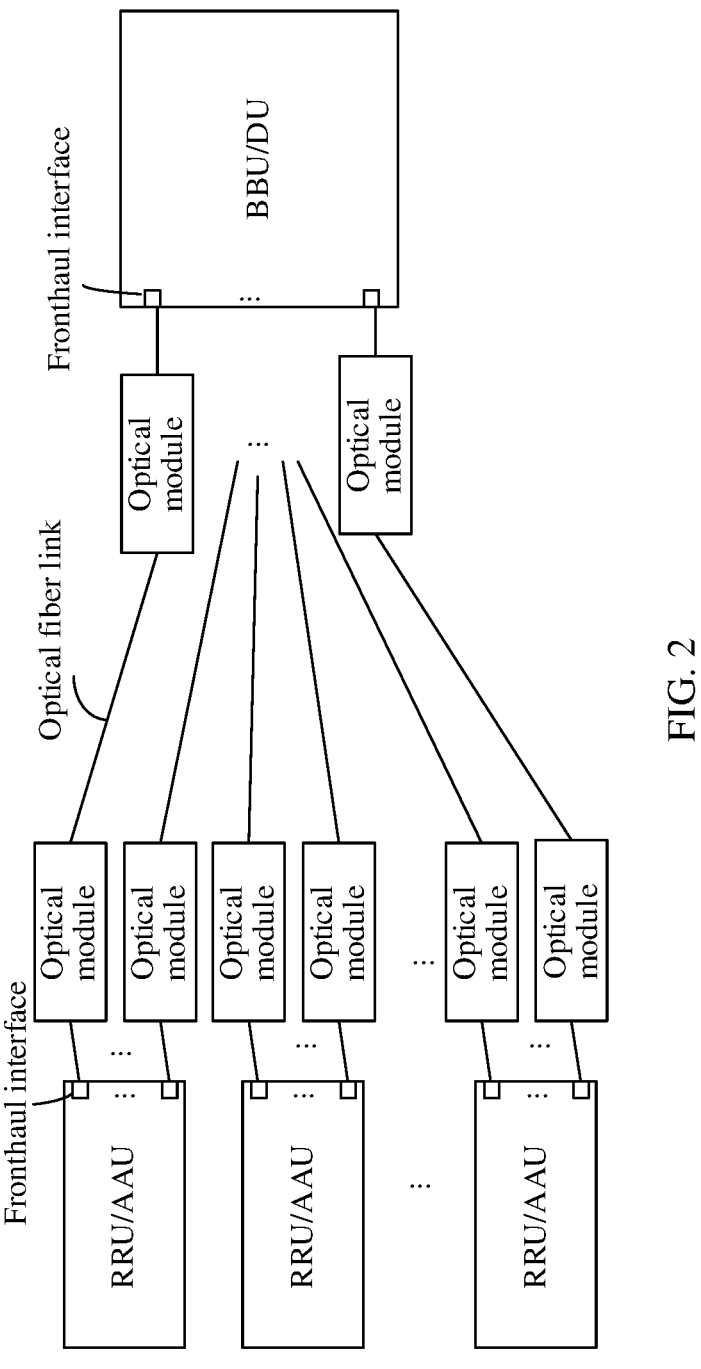
FIG. 2 is an optical fiber direct connection solution in a CRAN scenario.

FIG. 2 shows an optical fiber direct connection solution in a CRAN scenario. In an optical fiber direct connection solution, a BBU or a DU is directly connected to an RRU or an AAU through an optical fiber link. Refer to FIG. 2. One BBU or DU may have one or more fronthaul interfaces, and each fronthaul interface may be connected to an optical module. One RRU or AAU may have one or more fronthaul interfaces, and each fronthaul interface may be connected to an optical module. The fronthaul interface may be a CPRI or an eCPRI, and the optical module is configured to implement conversion between an optical signal and an electrical signal. The optical module connected to the fronthaul interface of the BBU or the DU may be connected, through an optical fiber, to the optical module connected to the fronthaul interface of the RRU or the AAU, to implement communication between the RRU or the AAU and the BBU or the DU.

In the solution shown in FIG. 2, more RRUs or AAUs being connected to one BBU or DU indicates that more optical fiber resources are required, and network construction costs are higher. To reduce the network construction costs, use of the optical fiber resources needs to be reduced.

In view of this consideration, this disclosure provides an optical communication system and method. A plurality of optical modules at a local end are cascaded, so that communication between a plurality of fronthaul interfaces at the local end and a peer end can be implemented through only one optical fiber link (which may include one or more optical fibers), thereby saving optical fiber resources. The following describes the solution provided in this application.

First, several terms in the solution provided in this disclosure are described in a general manner.

(1) A "local end" refers to a baseband module side, and correspondingly, a "peer end" refers to a radio frequency module side. Alternatively, a "local end" refers to a radio frequency module side, and correspondingly, a "peer end" refers to a baseband module side.

(2) A "baseband module" refers to a module or unit configured to perform baseband processing, or a module or unit configured to perform a part of baseband processing. For example, a baseband module is a BBU or a DU. Alternatively, a baseband module may be a part of a BBU or a DU. One BBU or DU may include one or more baseband modules.

(3) A "radio frequency module" refers to a module or unit configured to perform radio frequency processing. For example, a radio frequency module may be an RRU or an AAU. Alternatively, a radio frequency module may be a part of an RRU or an AAU. One RRU or AAU may include one or more radio frequency modules.

Figure 3:
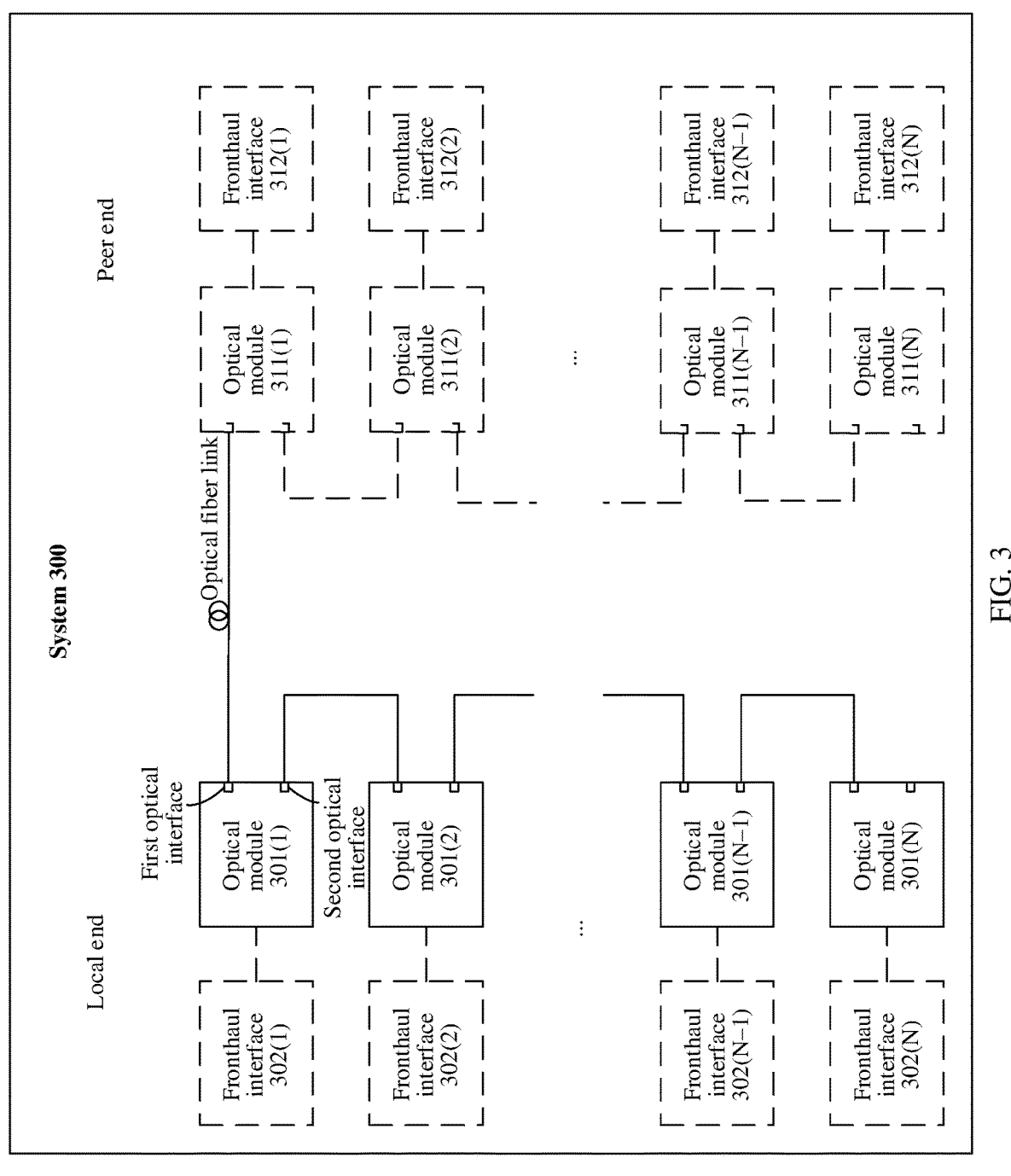
FIG. 3 is a schematic diagram of an optical communication system according to this disclosure.

FIG. 3 is a schematic diagram of an optical communication system according to this disclosure; As shown in FIG. 3, a system 300 includes N optical modules at a local end, that is, optical modules 301(1) to 301(N), which may be denoted as a first optical module, a second optical module, . . . , and an $N^{th}$ optical module. An optical module at the local end may be connected to a fronthaul interface at the local end (in which the fronthaul interface may have another name, or may be referred to as an interface, and this is not limited in embodiments of this application). Each optical module includes two optical interfaces, which are denoted as a first optical interface and a second optical interface.

A first optical interface of a first optical module in the N optical modules at the local end is connected to a peer end through an optical fiber link. A second optical interface of an $i^{th}$ optical module in the N optical modules at the local end is connected to a first optical interface of an $(i+1)^{th}$ optical module in the N optical modules at the local end, and i=1, 2, . . . , N−1.

To be specific, a first optical interface of a first optical module in the N optical modules at the local end is connected to a peer end through an optical fiber link, a second optical interface of the first optical module in the N optical modules at the local end is connected to a first optical interface of a second optical module in the N optical modules at the local end, a second optical interface of the second optical module in the N optical modules at the local end is connected to a first optical interface of a third optical module in the N optical modules at the local end, . . . , and so on.

It should be understood that this application is described by using an example in which the first optical module at the local end is connected to the peer end through the optical fiber link. It should be noted that the first optical module may be connected to the peer end through a link of another medium. This is not limited in embodiments of this application.

Specifically, refer to FIG. 3. The optical module 301(1) is connected to a fronthaul interface 302(1), an optical module 301(2) is connected to a fronthaul interface 302(2), . . . , and by analogy, the optical module 301(N) is connected to a fronthaul interface 302(N). A first optical interface of the optical module 301(1) is connected to the peer end through the optical fiber link, a second optical interface of the optical module 301(1) is connected to a first optical interface of the optical module 301(2), a second optical interface of the optical module 301(2) is connected to a first optical interface of an optical module 301(3), . . . , and by analogy, a second optical interface of an optical module 301(N–1) is connected to a first optical interface of the optical module 301(N).

In the optical communication system provided in this disclosure, an optical module at the local end may be connected to a fronthaul interface at the local end. The plurality of optical modules at the local end are cascaded, so that communication between a plurality of fronthaul interfaces at the local end and the peer end can be implemented through only one optical fiber link, thereby saving optical fiber resources. In addition, it is unnecessary to introduce another element, such as a passive multiplexer/demultiplexer, in the optical communication system provided in this application. Therefore, network construction costs can be reduced.

It should be understood that assemblies included in the peer end and connection relationships between assemblies are not limited in this application.

Optionally, the peer end may include one or more fronthaul interfaces and/or one or more optical modules, which are described below with reference to two possible implementations. It may be understood that a connection manner between fronthaul interfaces at the peer end and a connection manner between a fronthaul interface at the peer end and an optical module at the peer end are not limited in this disclosure.

In a possible implementation, a fronthaul interface at the peer end may be connected to an optical module at the peer end. These optical modules at the peer end may be connected to a passive multiplexer/demultiplexer. The passive multiplexer/demultiplexer may be connected to the first optical interface of the first optical module in the N optical modules at the local end through an optical fiber.

In another possible implementation, the system 300 may further include N optical modules at a peer end, that is, optical modules 311(1) to 311(N). One optical module at the peer end may be connected to one fronthaul interface at the peer end. In addition, a connection manner between the N optical modules at the peer end is the same as a connection manner between the N optical modules at the local end. Similarly, each optical module includes a first optical interface and a second optical interface.

Specifically, a first optical interface of a first optical module in the N optical modules at the peer end is connected to the first optical interface of the first optical module in the N optical modules at the local end through the optical fiber. A second optical interface of an $i^{th}$ optical module in the N optical modules at the peer end is connected to a first optical interface of an $(i+1)^{th}$ optical module in the N optical modules at the peer end.

Refer to FIG. 3. A first optical interface of the optical module 311(1) is connected to the first optical interface of the optical module 301(1) through the optical fiber link, a second optical interface of the optical module 311(1) is connected to a first optical interface of an optical module 311(2), a second optical interface of the optical module 311(2) is connected to a first optical interface of an optical module 311(3), . . . , and by analogy, a second optical interface of an optical module 311(N–1) is connected to a first optical interface of an optical module 311(N).

Based on the foregoing another possible implementation, an optical module at the peer end may be connected to a fronthaul interface at the peer end. The plurality of optical modules at the peer end are cascaded, so that communication between a plurality of fronthaul interfaces at the local end and a plurality of fronthaul interfaces at the peer end can be implemented through only one optical fiber link, thereby saving optical fiber resources. In addition, in this solution, it is unnecessary to introduce another device, such as a passive multiplexer/demultiplexer. Therefore, network construction costs can be reduced.

Optionally, in this application, for the local end or the peer end, a cascading between the optical modules may be implemented by using a single-core optical fiber patch cord, so that correspondences between the optical interfaces are simple, thereby lowering possibility of errors.

Optionally, the local end may include one or more baseband modules of a base station, and the peer end may include one or more radio frequency modules of the base station. Alternatively, the peer end may include one or more radio frequency modules of a base station, and the local end may include one or more baseband modules of the base station.

It should be understood that in a case that the local end is a baseband module side, the N fronthaul interfaces connected to the N optical modules at the local end may be distributed on one baseband module, or may be distributed on the plurality of baseband modules. Correspondingly, the N fronthaul interfaces connected to the N optical modules at the peer end may be distributed on one radio frequency module, or may be distributed on the plurality of radio frequency modules. For example, in a networking mode in which three sectors of radio frequency modules are used for one base station, to complete data transmission, three pairs of optical modules may be required. Three fronthaul interfaces connected to three optical modules at the local end may be distributed on two baseband modules (for example, two fronthaul interfaces are distributed on one baseband module, and one fronthaul interface is distributed on the other baseband module). Three optical modules at the peer end are distributed on three radio frequency modules (for example, three optical modules are in one-to-one correspondence with three radio frequency modules). For another example, in a case that N=4, the N fronthaul interfaces at the baseband module side may be distributed on two baseband modules. To be specific, each baseband module may have two fronthaul interfaces. The N fronthaul interfaces at the radio frequency module side may be distributed on two radio frequency modules. To be specific, each radio frequency module may have two fronthaul interfaces.

It should be further understood that in a case that the local end is a radio frequency module side, the N fronthaul interfaces connected to the N optical modules at the local end may be distributed on one radio frequency module, or may be distributed on the plurality of radio frequency modules. Correspondingly, the N fronthaul interfaces connected to the N optical modules at the peer end may be distributed on one baseband module, or may be distributed on the plurality of baseband modules. For details, refer to the description in the previous paragraph. A difference lies in that positions of the local end and the peer end are exchanged.

Optionally, the fronthaul interface may be a CPRI or an eCPRI.

Optionally, any optical module at the foregoing local end in FIG. 3 is configured to: convert, into an optical signal of a specific wavelength (denoted as a first optical signal), an electrical signal input from a fronthaul interface connected to the optical module, output the optical signal through a first optical interface of the optical module, and output, through the first optical interface of the optical module, an optical signal input to a second optical interface of the optical module from a first optical interface of another optical module connected to the second optical interface of the optical module; and convert, into an electrical signal, an optical signal of another specific wavelength (denoted as a second optical signal) input to the first optical interface of the optical module from the optical fiber link or a second optical interface of another optical module connected to the first optical interface of the optical module, output the electrical signal to the fronthaul interface connected to the optical module, and output, through the second optical interface of the optical module, an optical signal of another wavelength input to the first optical interface of the optical module from the optical fiber link or a second optical interface of another optical module connected to the first optical interface of the module.

It should be understood that in embodiments of this application, a wavelength may be a specific value. For example, a wavelength of an optical signal is 1271 nm. Alternatively, a wavelength may be a value range, for example, 1271 nm to 1371 nm. That is, a wavelength of an optical signal floats within 1271 nm to 1371 nm.

For any optical module in the N optical modules at the local end, wavelengths of a first optical signal and a second optical signal that are corresponding to the optical module are different. In addition, for any two optical modules in the N optical modules at the local end, wavelengths of first optical signals corresponding to the two optical modules are different, and wavelengths of second optical signals corresponding to the two optical modules are also different.

Specifically, each optical module in the N optical modules at the local end is connected to a fronthaul interface at the local end. The first optical module in the N optical modules at the local end is configured to:

convert, into an optical signal of a first wavelength, an electrical signal input from a fronthaul interface connected to the first optical module, output the optical signal to the peer end through the first optical interface of the first optical module, and output, to the peer end through the first optical interface of the first optical module, an optical signal input from the first optical interface of the second optical module to the second optical interface of the first optical module; and convert, into an electrical signal, an optical signal of an $(N+1)^{th}$ wavelength input from the peer end to the first optical interface of the first optical module, output the electrical signal to the fronthaul interface connected to the first optical module, and output, to the first optical interface of the second optical module through the second optical interface of the first optical module, an optical signal of another wavelength input from the peer end to the first optical interface of the first optical module.

A $j^{th}$ optical module in the N optical modules at the local end is configured to:

convert, into an optical signal of a $j^{th}$ wavelength, an electrical signal input from a fronthaul interface connected to the $j^{th}$ optical module, output the optical signal to a second optical interface of a $(j-1)^{th}$ optical module through a first optical interface of the $j^{th}$ optical module, and output, to the second optical interface of the $(j-1)^{th}$ optical module through the first optical interface of the $j^{th}$ optical module, an optical signal input from a first optical interface of a $(j+1)^{th}$ optical module to a second optical interface of the $j^{th}$ optical module; and convert, into an electrical signal, an optical signal of a $(j+N)^{th}$ wavelength input from a first optical interface of the $(j-1)^{th}$ optical module to the first optical interface of the $j^{th}$ optical module, output the electrical signal to the fronthaul interface connected to the $j^{th}$ optical module, and output, to the first optical interface of the $(j+1)^{th}$ optical module through the second optical interface of the $j^{th}$ optical module, an optical signal of another wavelength input from the first optical interface of the $(j-1)^{th}$ optical module to the first optical interface of the $j^{th}$ optical module, where j=2, 3, . . . , N−1.

The $N^{th}$ optical module in the N optical modules at the local end is configured to:

convert, into an optical signal of an $N^{th}$ wavelength, an electrical signal input from a fronthaul interface connected to the $N^{th}$ optical module, and output the optical signal to a second optical interface of an $(N-1)^{th}$ optical module through a first optical interface of the $N^{th}$ optical module; and convert, into an electrical signal, an optical signal of a $2N^{th}$ wavelength input to the first optical interface of the $N^{th}$ optical module, and output the electrical signal to the fronthaul interface connected to the $N^{th}$ optical module.

It may be understood that for the N modules at the local end, a first optical signal and a second optical signal that are corresponding to the first optical module are respectively the optical signal of the first wavelength and the optical signal of the $(N+1)^{th}$ wavelength. A first optical signal and a second optical signal that are corresponding to the second optical module are respectively an optical signal of a second wavelength and an optical signal of an $(N+2)^{th}$ wavelength. A first optical signal and a second optical signal that are corresponding to the third optical module are respectively an optical signal of a third wavelength and an optical signal of an $(N+3)^{th}$ wavelength. By analogy, a first optical signal and a second optical signal that are corresponding to the $N^{th}$ optical module are respectively the optical signal of the $N^{th}$ wavelength and the optical signal of the $2N^{th}$ wavelength.

Figure 4:
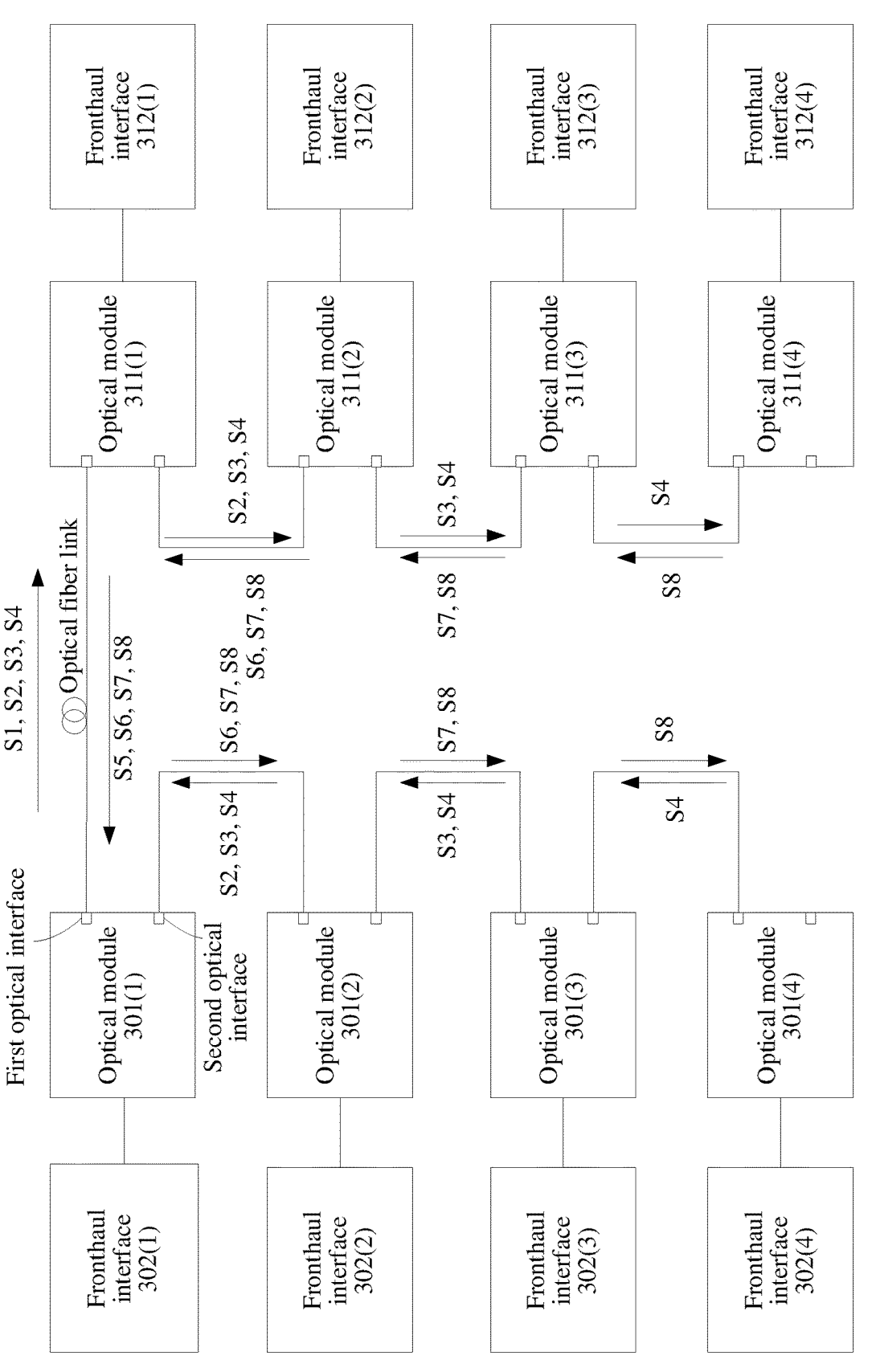
FIG. 4 is a schematic diagram of an optical communication system according to this disclosure.

The following uses an example in which N=4 to describe the foregoing solution with reference to FIG. 4.

Refer to FIG. 4. The optical module 301(1) is connected to the fronthaul interface 302(1). The optical module 301(2) is connected to the fronthaul interface 302(2). The optical module 301(3) is connected to a fronthaul interface 302(3). An optical module 301(4) is connected to a fronthaul interface 302(4).

Correspondences between the first optical signals transmitted by the N optical modules at the local end and the second optical signals received by the N optical modules are shown in Table 1.

TABLE 1

| Optical module number | First optical signal | Second optical signal |
|---|---|---|
| 301(1) | S1 | S5 |
| 301(2) | S2 | S6 |
| 301(3) | S3 | S7 |
| 301(4) | S4 | S8 |

Specifically, an electrical signal input from the fronthaul interface 302(4) to the optical module 301(4) is converted into an optical signal S4 (that is, an optical signal of a fourth wavelength), and the optical signal S4 is output through a first optical interface of the optical module 301(4). Because the first optical interface of the optical module 301(4) is connected to a second optical interface of the optical module 301(3), the optical signal S4 is input to the second optical interface of the optical module 301(3).

An electrical signal input from the fronthaul interface 302(3) to the optical module 301(3) is converted into an optical signal S3 (that is, an optical signal of a third wavelength), and the optical signal S3 is output through the first optical interface of the optical module 301(3). In addition, the optical signal S4 input to the second optical interface of the optical module 301(3) is also output through the first optical interface of the optical module 301(3). Because the first optical interface of the optical module 301(3) is connected to the second optical interface of the optical module 301(2), the optical signals S3 and S4 are input to the second optical interface of the optical module 301(2).

An electrical signal input from the fronthaul interface 302(2) to the optical module 301(2) is converted into an optical signal S2 (that is, an optical signal of a second wavelength), and the optical signal S2 is output through the first optical interface of the optical module 301(2). In addition, the optical signals S3 and S4 input to the second optical interface of the optical module 301(2) are also output through the first optical interface of the optical module 301(2). Because the first optical interface of the optical module 301(2) is connected to the second optical interface of the optical module 301(1), the optical signals S2, S3, and S4 are input to the second optical interface of the optical module 301(1).

An electrical signal input from the fronthaul interface 302(1) to the optical module 301(1) is converted into an optical signal S1 (that is, an optical signal of a first wavelength), and the optical signal S1 is output through the first optical interface of the optical module 301(1). In addition, the optical signals S2, S3, and S4 input to the second optical interface of the optical module 301(1) are also output through the first optical interface of the optical module 301(1). In other words, the optical signals S1, S2, S3, and S4 are all output through the first optical interface of the optical module 301(1), and are transmitted to the peer end through the optical fiber. Wavelengths of the optical signals S1, S2, S3, and S4 are different.

Optical signals S5, S6, S7, and S8 transmitted by the peer end to the local end through the optical fiber link are input to the first optical interface of the optical module 301(1). Wavelengths of the optical signals S1 to S8 are different. A wavelength may be a specific value, or may be a value range. For details, refer to the foregoing description. When the wavelength is a numerical range, numerical ranges of the wavelengths of the optical signals S1 to S8 do not overlap with each other.

The optical module 301(1) may convert one optical signal in the optical signals S5, S6, S7, and S8 into an electrical signal, output the electrical signal to the fronthaul interface 302(1) connected to the optical module 301(1), and output other optical signals of the optical signals S5, S6, S7, and S8 from the second optical interface of the optical module 301(1). For example, as shown in the figure, the optical module 301(1) may convert the optical signal S5 (that is, an optical signal of a fifth wavelength) into an electrical signal, output the electrical signal to the fronthaul interface 302(1) connected to the optical module 301(1), and output the optical signals S6, S7 and S8 from the second optical interface of the optical module 301(1).

The optical module 301(2) may convert, into an electrical signal, one optical signal in optical signals input from the first optical interface of the optical module 301(2), output the electrical signal to the fronthaul interface 302(2) connected to the optical module 301(2), and output other optical signals from the second optical interface of the optical module 301(2). For example, as shown in the figure, the optical module 301(2) may convert, into an electrical signal, the optical signal S6 (that is, an optical signal of a sixth wavelength) in the optical signals S6, S7, and S8 input from the first optical interface of the optical module 301(2), output the electrical signal to the fronthaul interface 302(2) connected to the optical module 301(2), and output the optical signals S7 and S8 from the second optical interface of the optical module 301(2).

The optical module 301(3) may convert, into an electrical signal, one optical signal in optical signals input from the first optical interface of the optical module 301(3), output the electrical signal to the fronthaul interface 302(3) connected to the optical module 301(3), and output other optical signals from the second optical interface of the optical module 301(3). For example, as shown in the figure, the optical module 301(3) may convert, into an electrical signal, the optical signal S7 (that is, an optical signal of a seventh wavelength) in the optical signals S7 and S8 input from the first optical interface of the optical module 301(3), output the electrical signal to the fronthaul interface 302(3) connected to the optical module 301(3), and output the optical signal S8 from the second optical interface of the optical module 301(3).

The optical module 301(4) may convert, into an electrical signal, an optical signal input from the first optical interface of the optical module 301(4), and output the electrical signal to the fronthaul interface 302(4) connected to the optical module 301(4). For example, as shown in the figure, the optical module 301(4) may convert, into an electrical signal, the optical signal S8 (that is, an optical signal of an eighth wavelength) input from the first optical interface of the optical module 301(4), and output the electrical signal to the fronthaul interface 302(4) connected to the optical module 301(4).

The optical module provided in this application can implement sending and receiving of the optical signals of the optical module (for example, the foregoing first optical signal and the foregoing second optical signal), and can further implement path transparent transmission of optical signals of ports of adjacent optical modules cascaded with the optical modules. In addition, because wavelengths of the first optical signals transmitted by the plurality of optical modules are different, the plurality of optical modules may be cascaded, so that signal transmission between the local end and the peer end can be implemented through one optical fiber link.

Optionally, a function of any optical module at the foregoing peer end in FIG. 3 is the same as a function of an optical module at the local end. For any optical module in the N optical modules at the peer end, wavelengths of a first optical signal and a second optical signal that are corresponding to the optical module are different. In addition, for any two optical modules in the N optical modules at the peer end, wavelengths of first optical signals corresponding to the two optical modules are different, and wavelengths of second optical signals are also different. In addition, for any optical module at the local end and any optical module at the peer end, wavelengths of first optical signals corresponding to the two optical modules are different, and wavelengths of second optical signals are also different.

Specifically, each optical module in the N optical modules at the peer end is connected to a fronthaul interface at the peer end. The first optical module in the N optical modules at the peer end is configured to:

convert, into an optical signal of an $(N+1)^{th}$ wavelength, an electrical signal input from a fronthaul interface connected to the first optical module, output the optical signal to the peer end through the first optical interface of the first optical module, and output, to the peer end through the first optical interface of the first optical module, an optical signal input from a first optical interface of a second optical module to a second optical interface of the first optical module; and convert, into an electrical signal, an optical signal of a first wavelength input from the peer end to the first optical interface of the first optical module, output the electrical signal to the fronthaul interface connected to the first optical module, and output, to the first optical interface of the second optical module through the second optical interface of the first optical module, an optical signal of another wavelength input from the peer end to the first optical interface of the first optical module.

A $j^{th}$ optical module in the N optical modules at the peer end is configured to:

convert, into an optical signal of a $(j+N)^{th}$ wavelength, an electrical signal input from a fronthaul interface connected to the $j^{th}$ optical module, output the optical signal to a second optical interface of a $(j-1)^{th}$ optical module through a first optical interface of the $j^{th}$ optical module, and output, to the second optical interface of the $(j-1)^{th}$ optical module through the first optical interface of the $j^{th}$ optical module, an optical signal input from a first optical interface of a $(j+1)^{th}$ optical module to a second optical interface of the $j^{th}$ optical module; and convert, into an electrical signal, an optical signal of a $j^{th}$ wavelength input from a first optical interface of the $(j-1)^{th}$ optical module to the first optical interface of the $j^{th}$ optical module, output the electrical signal to the fronthaul interface connected to the $j^{th}$ optical module, and output, to the first optical interface of the $(j+1)^{th}$ optical module through the second optical interface of the $j^{th}$ optical module, an optical signal of another wavelength input from the first optical interface of the $(j-1)^{th}$ optical module to the first optical interface of the $j^{th}$ optical module, where j=2, 3, . . . , N−1.

An $N^{th}$ optical module in the N optical modules at the peer end is configured to:

convert, into an optical signal of a $2N^{th}$ wavelength, an electrical signal input from a fronthaul interface connected to the $N^{th}$ optical module, and output the optical signal to a second optical interface of an $(N−1)^{th}$ optical module through a first optical interface of the $N^{th}$ optical module; and convert, into an electrical signal, an optical signal of an $N^{th}$ wavelength input to the first optical interface of the $N^{th}$ optical module, and output the electrical signal to the fronthaul interface connected to the $N^{th}$ optical module.

It may be understood that for the N modules at the peer end, a first optical signal and a second optical signal that are corresponding to the first optical module are respectively the optical signal of the $(N+1)^{th}$ wavelength and the optical signal of the first wavelength. A first optical signal and a second optical signal that are corresponding to the second optical module are respectively an optical signal of an $(N+2)^{th}$ wavelength and an optical signal of a second wavelength. A first optical signal and a second optical signal that are corresponding to a third optical module are respectively an optical signal of an $(N+3)^{th}$ wavelength and an optical signal of a third wavelength. By analogy, a first optical signal and a second optical signal that are corresponding to the $N^{th}$ optical module are respectively the optical signal of the $2N^{th}$ wavelength and the optical signal of the $N^{th}$ wavelength.

The following still uses an example in which N=4 to describe the foregoing solution with reference to FIG. 4.

Refer to FIG. 4. The optical module 311(1) is connected to a fronthaul interface 312(1). The optical module 311(2) is connected to a fronthaul interface 312(2). The optical module 311(3) is connected to a fronthaul interface 312(3). An optical module 311(4) is connected to a fronthaul interface 312(4).

Correspondences between the first optical signals transmitted by the optical modules and the second optical signals received by the optical modules are shown in Table 2.

TABLE 2

| Optical module number | First optical signal | Second optical signal |
|---|---|---|
| 311(1) | S5 | S1 |
| 311(2) | S6 | S2 |
| 311(3) | S7 | S3 |
| 311(4) | S8 | S4 |

Specifically, electrical signals input from the fronthaul interfaces 312(4), 312(3), 312(2), and 312(1) to the optical modules connected to the fronthaul interfaces 312(4), 312(3), 312(2), and 312(1) are converted into optical signals S8 (that is, an optical signal of an eighth wavelength), S7 (that is, an optical signal of a seventh wavelength), S6 (that is, an optical signal of a sixth wavelength), and S5 (that is, an optical signal of a fifth wavelength). The optical signal S8 is input to a second optical interface of the optical module 311(3) through a first optical interface of the optical module 311(4). The optical signals S7 and S8 are input to the second optical interface of the optical module 311(2) through the first optical interface of the optical module 311(3). The optical signals S6, S7, and S8 are input to the second optical interface of the optical module 311(1) through the first optical interface of the optical module 311(2). The optical signals S5, S6, S7, and S8 are output through the first optical interface of the optical module 311(1), and are transmitted to the first optical interface of the optical module 301(1) through the optical fiber.

The optical module 311(1) may convert, into an electrical signal, an optical signal S1 in optical signals S1 (that is, the optical signal of a first wavelength), S2 (that is, an optical signal of a second wavelength), S3 (that is, an optical signal of a third wavelength), and S4 (that is, an optical signal of a fourth wavelength), output the electrical signal to the fronthaul interface 312(1) connected to the optical module 311(1), and output the optical signals S2, S3, and S4 from the second optical interface of the optical module 311(1). The optical module 311(2) may convert, into an electrical signal, the optical signal S2 in the optical signals S2, S3, and S4 input from the first optical interface of the optical module 311(2), output the electrical signal to the fronthaul interface 312(2) connected to the optical module 311(2), and output the optical signals S3 and S4 from the second optical interface of the optical module 311(2). The optical module 311(3) may convert, into an electrical signal, the optical signal S3 in the optical signals S3 and S4 input from the first optical interface of the optical module 311(3), output the electrical signal to the fronthaul interface 312(3) connected to the optical module 311(3), and output the optical signal S4 from the second optical interface of the optical module 311(3). The optical module 311(4) may convert, into an electrical signal, the optical signal S4 input from the first optical interface of the optical module 311(4), and output the electrical signal to the fronthaul interface 312(4) connected to the optical module 311(4).

It may be understood that with reference to sending and receiving relationships between the optical signals of the optical modules at the local end and the optical modules at the peer end shown in FIG. 4, correspondences between the optical modules at the local end and the optical modules at the peer end are shown in Table 3.

TABLE 3

| Optical module number | Paired optical module number |
|---|---|
| 301(1) | 311(1) |
| 301(2) | 311(2) |
| 301(3) | 311(3) |
| 301(4) | 311(4) |

It should be understood that the correspondences between the optical modules at the local end and the optical modules at the peer end shown in Table 3 are merely examples. During practical deployment, optical modules do not need to be deployed based on the correspondences shown in Table 3. In practical deployment, if a fronthaul interface A (for example, the fronthaul interface 302(1)) of the local end is expected to communicate with a fronthaul interface B (for example, the fronthaul interface 311(2)) of the peer end, an optical module A (for example, the optical module 301(1)) connected to the fronthaul interface A may be matched with an optical module B (for example, the optical module 311(1)) connected to the fronthaul interface B. To be specific, an optical module A is designed to receive an optical signal transmitted by an optical module B and convert the optical signal into an electrical signal. In addition, the optical module B is designed to receive an optical signal transmitted by the optical module A and convert the optical signal into an electrical signal.

It should be further understood that in a case that both the local end and the peer end have N optical modules, correspondences between first optical signals transmitted by the optical modules and second optical signals received by the optical modules and correspondences between the optical modules at the local end and the optical modules at the peer end may be shown in Table 4.

TABLE 4

| Optical module number | First optical signal | Second optical signal | Paired optical module number |
|---|---|---|---|
| 301(1) | S1 | S(N + 1) | 311(1) |
| 301(2) | S2 | S(N + 2) | 311(2) |
| 301(3) | S3 | S(N + 3) | 311(3) |
| 301(4) | S4 | S(N + 4) | 311(4) |
| . . . | . . . | . . . | . . . |
| 301(N − 1) | S(N − 1) | S(2N − 1) | 311(N − 1) |
| 301(N) | S(N) | S(2N) | 311(N) |
| 311(1) | S(N + 1) | S1 | 301(1) |
| 311(2) | S(N + 2) | S2 | 301(2) |
| 311(3) | S(N + 3) | S3 | 301(3) |
| 311(4) | S(N + 4) | S4 | 301(4) |
| . . . | . . . | . . . | . . . |

TABLE 4-continued

| Optical module number | First optical signal | Second optical signal | Paired optical module number |
|---|---|---|---|
| 311(N − 1) | S(2N − 1) | S(N − 1) | 301(N − 1) |
| 311(N) | S(2N) | S(N) | 301(N) |

In conclusion, in the solution provided in this application, transparent transmission of a protocol and a rate can be implemented by using an optical-layer wavelength division solution and wavelength add/drop multiplexing. In addition, within an allowable range of insertion loss, because an optical module cascading is insensitive to a wavelength sequence, a deployment difficulty can be reduced.

The following describes a structure of the optical module described above with reference to FIG. 5.

Figure 5:
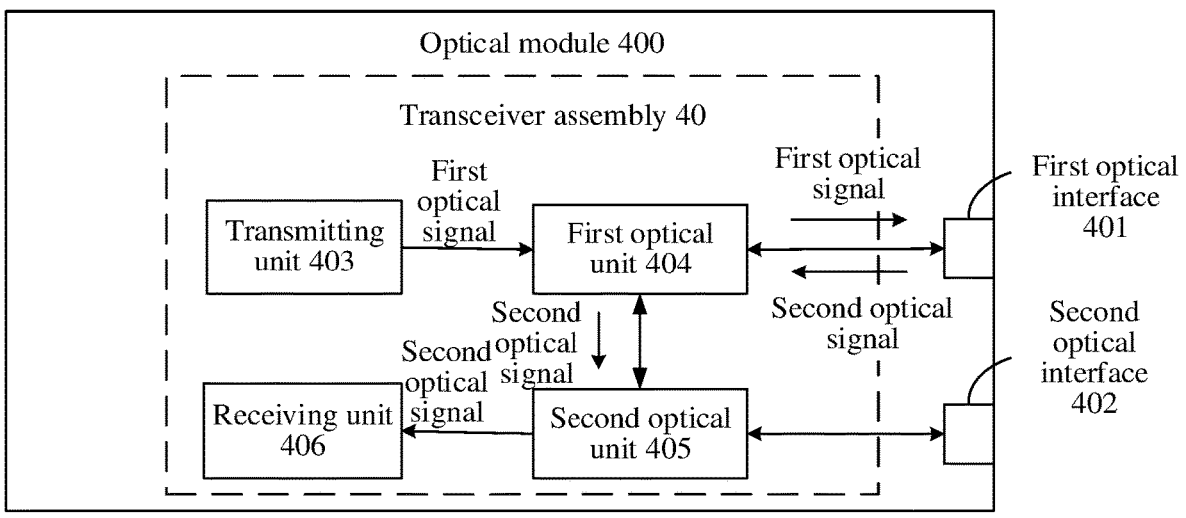
FIG. 5 is a schematic diagram of a structure of an optical module according to this disclosure.

FIG. 5 is a schematic diagram of a structure of an optical module 400. It should be understood that the optical module 400 may be any one of the optical modules 301(1) to 301(N) and the optical modules 311(1) to 311(N). In other words, any one of the optical modules 301(1) to 301(N) and the optical modules 311(1) to 311(N) may be implemented by the optical module 400.

Refer to FIG. 5. The optical module 400 includes a first optical interface 401, a second optical interface 402, a transmitting unit 403, a first optical unit 404, a second optical unit 405, and a receiving unit 406. The transmitting unit 403, the first optical interface 401, and the second optical unit 405 are all coupled to the first optical unit 404. The receiving unit 406 and the second optical interface 402 are both coupled to the second optical unit 405.

The transmitting unit 403 is configured to transmit a first optical signal to the first optical interface 401.

The first optical unit 404 is configured to forward, to the first optical interface 401, the first optical signal received from the transmitting unit 403, forward, to the first optical interface 401, an optical signal received from the second optical unit 405, and forward, to the second optical unit 405, an optical signal received from the first optical interface 401.

The second optical unit 405 is configured to forward, to the first optical unit 404, the optical signal received from the second optical interface 402, forward, to the receiving unit 406, a second optical signal received from the first optical unit 401, and forward, to the second optical interface 402, an optical signal received from the first optical unit 401.

The receiving unit 406 is configured to receive the second optical signal from the second optical unit 405.

Optionally, the first optical unit may further convert, into the first optical signal, an electrical signal input to the transmitting unit 403, and then transmit the first optical signal to the first optical interface 401.

Optionally, the receiving unit 406 may further convert the second optical signal into an electrical signal for output.

In an example in which the optical module 400 is the optical module 301(1) shown in FIG. 4, the first optical signal is S1, and the second optical signal is S5. In an example in which the optical module 400 is the optical module 301(2) shown in FIG. 4, the first optical signal is S2, and the second optical signal is S6.

Therefore, the optical module provided in this application transmits the first optical signal, receives the second optical signal, forwards another signal that passes through the first optical interface to the second optical interface, and forwards another signal that passes through the second optical interface to the first optical interface, so that an optical-layer wavelength division solution and wavelength add/drop multiplexing can be implemented. In this way, transparent transmission of a protocol and a rate can be implemented. In addition, based on the optical module provided in this application, a plurality of optical modules can be cascaded, so that communication between a plurality of fronthaul interfaces at a local end and a plurality of fronthaul interfaces at a peer end can be implemented through only one optical fiber link, thereby saving optical fiber resources.

It may be understood that the transmitting unit 403 and the receiving unit 406 may be connected to one fronthaul interface.

It should be understood that the fronthaul interface connected to the optical module 400 may be directly or indirectly connected to the transmitting unit 403. For example, the fronthaul interface may be connected to the transmitting unit 403 in sequence through a transmitting end clock recovery unit and a driving unit. Specific functions, implementations, and the like of the transmitting end clock recovery unit and the driving unit are not limited in embodiments of this application.

It should be understood that the transmitting unit 403 may be directly or indirectly connected to the fronthaul interface. For example, the transmitting unit 403 may be connected to the fronthaul interface through a receiving end clock recovery unit. A specific function, implementation, and the like of the receiving end clock recovery unit are not limited in embodiments of this application, and details are not described herein again.

It should be understood that the transmitting unit 403 may be any part or structure that can implement optical signal transmission. For example, the transmitting unit 403 may be a laser. The receiving unit 406 may be any part or structure that can implement optical signal receiving, for example, may be an avalanche photodiode (APD).

A person skilled in the art may understand that when the optical module 400 is a $k^{th}$ (k=1, 2, . . . , N) optical module in the N optical modules at the local end shown in FIG. 3, the transmitting unit 403 may convert, into an optical signal of a $k^{th}$ wavelength, an electrical signal input from a fronthaul interface connected to the $k^{th}$ optical module, and transmit a first optical signal to the first optical interface 401.

In addition, in a case that k≠T, the first optical unit 404 may forward, to the first optical interface 401, the optical signal of the $k^{th}$ wavelength received from the transmitting unit 403, forward, to the first optical interface 401, an optical signal of a $(k+1)^{th}$ wavelength to an $N^{th}$ wavelength received from the second optical unit 405, and forward, to the second optical unit 405, an optical signal of a $(k+N)^{th}$ wavelength to a $2N^{th}$ wavelength received from the first optical interface 401;

the second optical unit 405 may forward, to the first optical unit 404, the optical signal of the $(k+1)^{th}$ wavelength to the $N^{th}$ wavelength received from the second optical interface 402, forward, to the receiving unit 406, an optical signal of the $(k+N)^{th}$ wavelength received from the first optical unit 404, and forward, to the second optical interface 402, an optical signal of a $(k+N+1)^{th}$ wavelength to the $2N^{th}$ wavelength received from the first optical unit 404; and the receiving unit 406 may receive the optical signal of the $(k+N)^{th}$ wavelength from the second optical unit 405, convert the optical signal into an electrical signal, and output the electrical signal to the fronthaul interface connected to the $k^{th}$ optical module.

In a case that k=N, the first optical unit 404 may forward, to the first optical interface 401, the optical signal of the $k^{th}$ wavelength received from the transmitting unit 403, and forward, to the second optical unit 405, an optical signal of a $2k^{th}$ wavelength received from the first optical interface 401;

the second optical unit 405 may forward, to the receiving unit 406, the optical signal of the $2k^{th}$ wavelength received from the first optical unit 404; and the receiving unit 406 is configured to receive the optical signal of the $2k^{th}$ wavelength from the second optical unit 405, convert the optical signal into an electrical signal, and output the electrical signal to the fronthaul interface connected to the $k^{th}$ optical module.

In addition, when the optical module 400 is a $k^{th}$ (k=1, 2, . . . , N) optical module in the N optical modules at the peer end shown in FIG. 3, the transmitting unit 403 may convert, into an optical signal of a $(k+N)^{th}$ wavelength, an electrical signal input from a fronthaul interface connected to the optical module, and transmit a first optical signal to the first optical interface 401.

In addition, in a case that k≠N, the first optical unit 404 may forward, to the first optical interface 401, the optical signal of the $(k+N)^{th}$ wavelength received from the transmitting unit 403, forward, to the first optical interface 401, an optical signal of a $(k+N+1)^{th}$ wavelength to a $2N^{th}$ wavelength received from the second optical unit 405, and forward, to the second optical unit 405, an optical signal of a $k^{th}$ wavelength to an $N^{th}$ wavelength received from the first optical interface 401;

the second optical unit 405 may forward, to the first optical unit 404, the optical signal of the $(k+N+1)^{th}$ wavelength to the $2N^{th}$ wavelength received from the second optical interface 402, forward, to the receiving unit 406, an optical signal of the $k^{th}$ wavelength received from the first optical unit 404, and forward, to the second optical interface 402, an optical signal of a $(k+1)^{th}$ wavelength to the $N^{th}$ wavelength received from the first optical unit 404; and the receiving unit 406 may receive the optical signal of the $k^{th}$ wavelength from the second optical unit 405, convert the optical signal into an electrical signal, and output the electrical signal to the fronthaul interface connected to the $k^{th}$ optical module.

In a case that k=N, the first optical unit 404 may forward, to the first optical interface 401, an optical signal of a $2k^{th}$ wavelength received from the transmitting unit 403, and forward, to the second optical unit 405, the optical signal of the $k^{th}$ wavelength received from the first optical interface 401;

the second optical unit 405 may forward, to the receiving unit 406, the optical signal of the $k^{th}$ wavelength received from the first optical unit 404; and the receiving unit 406 is configured to receive the optical signal of the $k^{th}$ wavelength from the second optical unit 405, convert the optical signal into an electrical signal, and output the electrical signal to the fronthaul interface connected to the $k^{th}$ optical module.

In a possible implementation, the transmitting unit 403, the first optical unit 404, the second optical unit 405, and the receiving unit 406 are encapsulated in a transceiver assembly 40. The transceiver assembly may be, for example, a bi-directional optical subassembly BOSA.

It should be understood that the conversion operation between an optical signal and an electrical signal described above may also be performed outside the BOSA.

For example, the first optical unit 404 may select the first optical signal. For example, the first optical unit 404 is configured to transmit the first optical signal and reflect an optical signal of another wavelength. The second optical unit 405 may select the second optical signal. For example, the second optical unit 405 is configured to transmit the second optical signal and reflect an optical signal of another wavelength. It may be understood that the first optical unit 404 may select the first optical signal in another manner, and the second optical unit 405 may select the second signal in another manner. This is not limited in embodiments of this application.

For example, a first optical path is parallel to a second optical path. The first optical path is an optical path for linear transmission of the first optical signal transmitted by the transmitting unit 403. The second optical path is an optical path for linear transmission of the second optical signal after passing through the second optical unit 405. In other words, the first optical path is an optical path for transmitting an optical signal of a first wavelength between the transmitting unit 403 and the first optical unit 404. The second optical path is an optical path for transmitting an optical signal of a second wavelength between the second optical unit 405 and the receiving unit 406.

The first optical path and the second optical path are designed as parallel optical paths, so that a package area of the BOSA or the optical module can be reduced.

Figure 6:
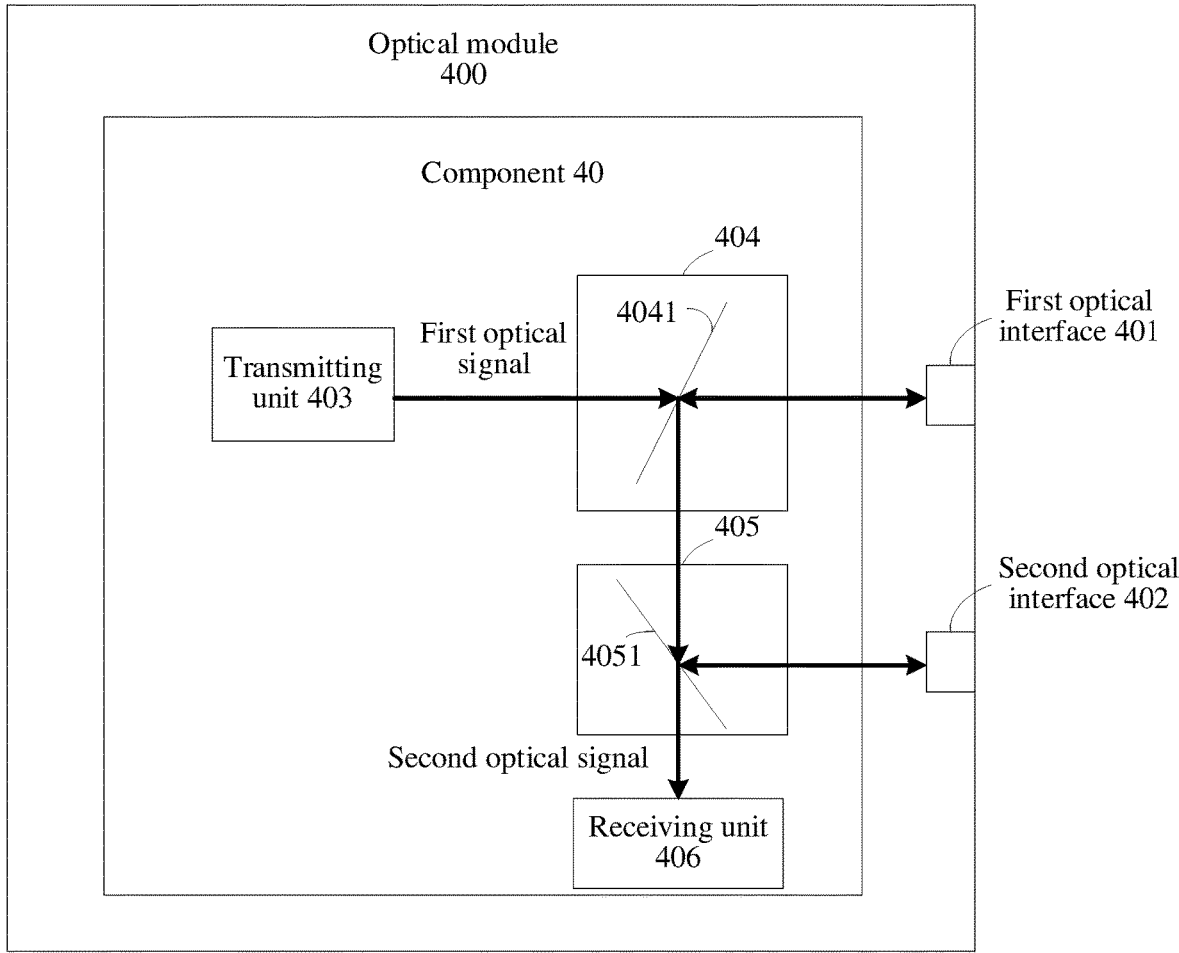
FIG. 6 is a schematic diagram of a structure of an optical module according to this disclosure.

A further option is described in FIG. 6. The first optical unit 404 may include a first optical filter 4041, and the second optical unit 405 may include a second optical filter 4051. The first optical filter 4041 is configured to transmit the first optical signal and reflect another optical signal. The second optical filter 4051 is configured to transmit the second optical signal and reflect another optical signal.

In an example in which the optical module 400 is the optical module 301(1) shown in FIG. 4, the first optical signal is S1, the second optical signal is S5, and other optical signals are S6, S7, and S8. In an example in which the optical module 400 is the optical module 301(2) shown in FIG. 4, the first optical signal is S2, the second optical signal is S6, and other optical signals are S7 and S8.

For example, the first optical filter 4041 and the second optical filter 4051 are both 45° optical filters.

A further option is described in FIG. 7. The second optical unit 405 may further include a first reflector 4052. The first reflector 4052 is configured to reflect, to the receiving unit 406, the second optical signal transmitted through the second optical filter 4051.

In this design manner, the first optical path can be parallel to the second optical path, so that a package area of the BOSA or the optical module can be reduced. This application further provides an apparatus 40. The apparatus 40 may be the BOSA shown in FIG. 5 to FIG. 7. For a structure of the apparatus 40, refer to the BOSA shown in FIG. 5 to FIG. 7. For a function of each unit in the apparatus 40, refer to the foregoing description. Details are not described herein again. It should be understood that the apparatus 40 may be used in the optical module 400.

FIG. 8 is a schematic flowchart of an optical communication method 500 according to this application. The method may include step S501.

S501. Connect a first optical interface of a first optical module in N optical modules at a local end to a peer end through an optical fiber link, and connect a second optical interface of an $i^{th}$ optical module in the N optical modules at the local end to a first optical interface of an $(i+1)^{th}$ optical module in the N optical modules at the local end, where each optical module in the N optical modules at the local end includes a first optical interface and a second optical interface, and i=1, 2, . . . , N−1.

It should be understood that an optical module at the local end may be connected to a fronthaul interface at the local end.

According to the method provided in this application, an optical module at the local end may be connected to a fronthaul interface at the local end. The plurality of optical modules at the local end are cascaded, so that communication between a plurality of fronthaul interfaces at the local end and the peer end can be implemented through only one optical fiber link, thereby saving optical fiber resources. In addition, in the method provided in this application, it is unnecessary to introduce a passive multiplexer/demultiplexer. Therefore, network construction costs can be reduced.

Optionally, the connecting a first optical interface of a first optical module in N optical modules at a local end to a peer end through an optical fiber link includes: connecting the first optical interface of the first optical module in the N optical modules at the local end to a first optical interface of a first optical module in N optical modules at the peer end through the optical fiber link.

The method 500 may further include:

S502. Connect the first optical interface of the first optical module in the N optical modules at the peer end to the first optical interface of the first optical module in the N optical modules at the local end through the optical fiber link, and connect a second optical interface of an $i^{th}$ optical module in the N optical modules at the peer end to a first optical interface of an $(i+1)^{th}$ optical module in the N optical modules at the peer end, where each optical module in the N optical modules at the peer end includes a first optical interface and a second optical interface.

It should be understood that an optical module at the peer end may be connected to a fronthaul interface at the peer end.

Based on this solution, an optical module at the peer end may be connected to a fronthaul interface at the peer end. The plurality of optical modules at the peer end are cascaded, so that communication between a plurality of fronthaul interfaces at the local end and a plurality of fronthaul interfaces at the peer end can be implemented through only one optical fiber link, thereby saving optical fiber resources. In addition, in this solution, it is unnecessary to introduce another device, such as a passive multiplexer/demultiplexer. Therefore, network construction costs can be reduced.

Optionally, the method 500 may further include: connecting each optical module in the N optical modules at the local end to a fronthaul interface of a baseband module, or connecting each optical module in the N optical modules at the local end to a fronthaul interface of a radio frequency module.

It should be understood that for a function and a structure of the optical module, refer to the foregoing description. Details are not described herein again.

Terms such as "part", "module", and "system" used in this specification are used to indicate computer-related entities, hardware, firmware, combinations of hardware and software, software, or software being executed. For example, a part may be, but is not limited to, a process that runs on a processor, a processor, an object, an executable file, an executable thread, a program, and/or a computer. As shown in figures, both a computing device and an application that runs on a computing device may be parts. One or more parts may reside within a process and/or an executable thread, and apart may be located on one computer and/or distributed between two or more computers. In addition, these parts may be executed from various computer-readable media that store various data structures. For example, the parts may communicate by using a local and/or a remote process and according to, for example, a signal having one or more data packets (for example, data from two parts interacting with another part in a local system, a distributed system, and/or across a network such as the Internet interacting with other systems by using the signal).

A person of ordinary skill in the art may be aware that in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this disclosure.

It may be clearly understood by a person skilled in the art that for convenient and brief description, for a detailed working process of the foregoing described system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division during practical implementation. For example, a plurality of units or assembly may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of embodiments.

In addition, functional units in embodiments of this disclosure may be integrated into one processing unit, or each of the units may exist alone physically, or two or more units are integrated into one unit.

The foregoing descriptions are merely specific implementations and are not intended to limit the protection scope of this disclosure. Any variation or replacement readily determined by a person skilled in the art within the technical scope of this disclosure shall fall within the protection scope of the accompanying claims.

What is claimed is:

1. An optical communication system, comprising:

N optical modules at a local end, each optical module in the N optical modules at the local end comprising a first optical interface and a second optical interface;

the first optical interface of a first optical module in the N optical modules at the local end is connected to a peer end through an optical fiber link; and the second optical interface of an $i^{th}$ optical module in the N optical modules at the local end is connected to a first optical interface of an $(i+1)^{th}$ optical module in the N optical modules at the local end, where $i=1, 2, \ldots, N-1$;

wherein each optical module in the N optical modules at the local end is connected to a fronthaul interface at the local end;

the first optical module in the N optical modules at the local end is configured to:

convert, into an optical signal of a first wavelength, an electrical signal input from a fronthaul interface connected to the first optical module, output the optical signal to the peer end through the first optical interface of the first optical module, and output, to the peer end through the first optical interface of the first optical module, an optical signal input from a first optical interface of a second optical module to a second optical interface of the first optical module; and convert, into an electrical signal, an optical signal of an $(N+1)^{th}$ wavelength input from the peer end to the first optical interface of the first optical module, output the electrical signal to the fronthaul interface connected to the first optical module, and output, to the first optical interface of the second optical module through the second optical interface of the first optical module, an optical signal of another wavelength input from the peer end to the first optical interface of the first optical module;

a $j^{th}$ optical module in the N optical modules at the local end is configured to:

convert, into an optical signal of a $j^{th}$ wavelength, an electrical signal input from a fronthaul interface connected to the $j^{th}$ optical module, output the optical signal to a second optical interface of a $(j-1)^{th}$ optical module through a first optical interface of the $j^{th}$ optical module, and output, to the second optical interface of the $(j-1)^{th}$ optical module through the first optical interface of the $j^{th}$ optical module, an optical signal input from a first optical interface of a $(j+1)^{th}$ optical module to a second optical interface of the $j^{th}$ optical module; and convert, into an electrical signal, an optical signal of a $(j+N)^{th}$ wavelength input from a first optical interface of the $(j-1)^{th}$ optical module to the first optical interface of the $j^{th}$ optical module, output the electrical signal to the fronthaul interface connected to the $j^{th}$ optical module, and output, to the first optical interface of the $(j+1)^{th}$ optical module through the second optical interface of the $j^{th}$ optical module, an optical signal of another wavelength input from the first optical interface of the $(j-1)^{th}$ optical module to the first optical interface of the $j^{th}$ optical module, wherein $j=2, 3, \ldots, N-1$; and an $N^{th}$ optical module in the N optical modules at the local end is configured to:

convert, into an optical signal of an $N^{th}$ wavelength, an electrical signal input from a fronthaul interface connected to the $N^{th}$ optical module, and output the optical signal to a second optical interface of an $(N-1)^{th}$ optical module through a first optical interface of the $N^{th}$ optical module; and convert, into an electrical signal, an optical signal of a $2N^{th}$ wavelength input to the first optical interface of the $N^{th}$ optical module, and output the electrical signal to the fronthaul interface connected to the $N^{th}$ optical module.

2. The system according to claim 1, wherein the system further comprises N optical modules at the peer end, wherein each optical module in the N optical modules at the peer end comprises a first optical interface and a second optical interface;

the first optical interface of a first optical module in the N optical modules at the peer end is connected to the first optical interface of the first optical module in the N optical modules at the local end through the optical fiber link; and the second optical interface of an $i^{th}$ optical module in the N optical modules at the peer end is connected to a first optical interface of an $(i+1)^{th}$ optical module in the N optical modules at the peer end.

3. The system according to claim 1, wherein the local end comprises one or more baseband modules of a base station, and the peer end comprises one or more radio frequency modules of the base station; or the local end comprises one or more radio frequency modules of a base station, and the peer end comprises one or more baseband modules of the base station.

4. The system according to claim 3, wherein each optical module in the N optical modules at the local end is connected to a fronthaul interface of a baseband module at the local end; or each optical module in the N optical modules at the local end is connected to a fronthaul interface of a radio frequency module at the local end.

5. An optical communication system, comprising:

N optical modules at a local end, each optical module in the N optical modules at the local end comprising a first optical interface and a second optical interface;

the first optical interface of a first optical module in the N optical modules at the local end is connected to a peer end through an optical fiber link; and the second optical interface of an $i^{th}$ optical module in the N optical modules at the local end is connected to a first optical interface of an $(i+1)^{th}$ optical module in the N optical modules at the local end, where i=1, 2 . . . , N−1;

wherein each optical module in the N optical modules at the local end is connected to a fronthaul interface at the local end;

the first optical module in the N optical modules at the local end is configured to:

convert, into an optical signal of a first wavelength, an electrical signal input from a fronthaul interface connected to the first optical module, output the optical signal to the peer end through the first optical interface of the first optical module, and output, to the peer end through the first optical interface of the first optical module, an optical signal input from a first optical interface of a second optical module to a second optical interface of the first optical module; and convert, into an electrical signal, an optical signal of an $(N+1)^{th}$ wavelength input from the peer end to the first optical interface of the first optical module, output the electrical signal to the fronthaul interface connected to the first optical module, and output, to the first optical interface of the second optical module through the second optical interface of the first optical module, an optical signal of another wavelength input from the peer end to the first optical interface of the first optical module;

a $j^{th}$ optical module in the N optical modules at the local end is configured to:

convert, into an optical signal of a $j^{th}$ wavelength, an electrical signal input from a fronthaul interface connected to the $j^{th}$ optical module, output the optical signal to a second optical interface of a $(j−1)^{th}$ optical module through a first optical interface of the $j^{th}$ optical module, and output, to the second optical interface of the $(j−1)^{th}$ optical module through the first optical interface of the $j^{th}$ optical module, an optical signal input from a first optical interface of a $(j+1)^{th}$ optical module to a second optical interface of the $j^{th}$ optical module; and convert, into an electrical signal, an optical signal of a $(j+N)^{th}$ wavelength input from a first optical interface of the $(j−1)^{th}$ optical module to the first optical interface of the $j^{th}$ optical module, output the electrical signal to the fronthaul interface connected to the $j^{th}$ optical module, and output, to the first optical interface of the $(j+1)^{th}$ optical module through the second optical interface of the $j^{th}$ optical module, an optical signal of another wavelength input from the first optical interface of the $(j−1)^{th}$ optical module to the first optical interface of the $j^{th}$ optical module, wherein j=2, 3, . . . , N−1; and an $N^{th}$ optical module in the N optical modules at the local end is configured to:

convert, into an optical signal of an $N^{th}$ wavelength, an electrical signal input from a fronthaul interface connected to the $N^{th}$ optical module, and output the optical signal to a second optical interface of an $(N−1)^{th}$ optical module through a first optical interface of the $N^{th}$ optical module; and convert, into an electrical signal, an optical signal of a $2N^{th}$ wavelength input to the first optical interface of the $N^{th}$ optical module, and output the electrical signal to the fronthaul interface connected to the $N^{th}$ optical module;

wherein a $k^{th}$ optical module in the N optical modules at the local end comprises:

a transmitting unit, a first optical unit, a second optical unit, and a receiving unit, wherein the transmitting unit, the first optical interface, and the second optical unit are all coupled to the first optical unit, the receiving unit and the second optical interface are both coupled to the second optical unit, and k=1, 2, . . . , N;

the transmitting unit is configured to convert, into an optical signal of a $k^{th}$ wavelength, an electrical signal input from a fronthaul interface connected to the $k^{th}$ optical module, and transmit a first optical signal to the first optical interface;

in a case that k≠N, the first optical unit is configured to forward, to the first optical interface, the optical signal of the $k^{th}$ wavelength received from the transmitting unit, forward, to the first optical interface, an optical signal of a $(k+1)^{th}$ wavelength to the $N^{th}$ wavelength received from the second optical unit, and forward, to the second optical unit, an optical signal of a $(k+N)^{th}$ wavelength to the $2N^{th}$ wavelength received from the first optical interface;

the second optical unit is configured to forward, to the first optical unit, the optical signal of the $(k+1)^{th}$ wavelength to the $N^{th}$ wavelength received from the second optical interface, forward, to the receiving unit, an optical signal of the $(k+N)^{th}$ wavelength received from the first optical unit, and forward, to the second optical interface, an optical signal of a $(k+N+1)^{th}$ wavelength to the $2N^{th}$ wavelength received from the first optical unit; and the receiving unit is configured to receive the optical signal of the $(k+N)^{th}$ wavelength from the second optical unit, convert the optical signal into an electrical signal, and output the electrical signal to the fronthaul interface connected to the $k^{th}$ optical module; and in a case that k=N, the first optical unit is configured to forward, to the first optical interface, the optical signal of the $k^{th}$ wavelength received from the transmitting unit, and forward, to the second optical unit, an optical signal of a $2k^{th}$ wavelength received from the first optical interface;

the second optical unit is configured to forward, to the receiving unit, the optical signal of the $2k^{th}$ wavelength received from the first optical unit; and the receiving unit is configured to receive the optical signal of the $2k^{th}$ wavelength from the second optical unit, convert the optical signal into an electrical signal, and output the electrical signal to the fronthaul interface connected to the $k^{th}$ optical module.

6. The system according to claim 5, wherein the first optical unit is configured to transmit the optical signal of the $k^{th}$ wavelength and reflect an optical signal of another wavelength different from the $k^{th}$ wavelength, and the second optical unit is configured to transmit the optical signal of the $(k+N)^{th}$ wavelength and reflect an optical signal of wavelengths different from the $(k+N)^{th}$ wavelength.

7. The system according to claim 6, wherein a first optical path is parallel to a second optical path, the first optical path is an optical path for transmitting the optical signal of the $k^{th}$ wavelength between the transmitting unit and the first optical unit, and the second optical path is an optical path for transmitting the optical signal of the $(k+N)^{th}$ wavelength between the second optical unit and the receiving unit.

8. The system according to claim 6, wherein the first optical unit comprises a first optical filter and the second optical unit comprises a second optical filter.

9. The system according to claim 8, wherein the first optical filter and the second optical filter are both 45° optical filters.

10. The system according to claim 8, wherein the second optical unit further comprises a first reflector configured to reflect, to the receiving unit, the optical signal of the $(k+N)^{th}$ wavelength transmitted through the second optical filter.

11. The system according to claim 5, wherein the transmitting unit, the first optical unit, the second optical unit, and the receiving unit are encapsulated in a bi-directional optical subassembly (BOSA).

12. The system according to claim 5, wherein the transmitting unit is a laser.

* * * * *